United States Patent
Dobbek et al.

(10) Patent No.: US 6,185,058 B1
(45) Date of Patent: *Feb. 6, 2001

(54) NO-ID DATA STORAGE DISK DRIVE DATA SECTOR FORMATTING SYSTEM AND METHOD

(75) Inventors: Jeffrey Joseph Dobbek, San Jose; Laura Sheung-ching Lam, Fremont, both of CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/872,508

(22) Filed: Jun. 10, 1997

Related U.S. Application Data

(63) Continuation of application No. 08/531,240, filed on Sep. 19, 1995, now abandoned.

(51) Int. Cl.[7] ....................................... G11B 5/09
(52) U.S. Cl. ................. 360/48; 360/53; 711/171
(58) Field of Search ................. 360/31, 48, 53, 360/55; 369/44.26, 47, 48, 50; 711/171

(56) References Cited

U.S. PATENT DOCUMENTS

| | | | |
|---|---|---|---|
| 4,924,330 | * 5/1990 | Seamons et al. | 360/66 |
| 5,210,660 | 5/1993 | Hetzler | 360/51 |
| 5,438,559 | 8/1995 | Best et al. | 369/54 |
| 5,450,384 | * 9/1995 | Dahman et al. | 360/48 X |
| 5,452,458 | * 9/1995 | Suzuki | 369/97 |
| 5,956,196 | * 9/1999 | Hull et al. | 360/65 |

FOREIGN PATENT DOCUMENTS

| | | | |
|---|---|---|---|
| 0 522 750 | 1/1993 | (EP) | G11B/20/12 |
| 2285166 | 12/1993 | (GB) | G11B/20/18 |
| 60-171677 | 9/1985 | (JP) | G11B/20/10 |
| 95/24038 | 9/1995 | (WO) | G11B/20/18 |

OTHER PUBLICATIONS

IBM TDB vol. 38, No. 6, Jun. 1995, "Method and System for Allowing Customer Access to Spare Capacity in a No–ID Disk Drive".
IBM TDB vol. 39, No. 5, May 1996, "Automated Hardware Processing of Direct Access Storage Device Skip Masks".
IBM TDB vol. 31, No. 7, Dec. 1988 "Disk Format Logic By Physical Sector".
IBM TDB vol. 36, No. 8, Aug. 1993 "High–Speed Formatting Operation For A Disk File".

* cited by examiner

Primary Examiner—Andrew L. Sniezek
Assistant Examiner—Regina Y. Neal
(74) Attorney, Agent, or Firm—Altera Law Group, LLC

(57) ABSTRACT

A data storage disk drive system uses a no-ID disk architecture. The disk is formatted by mapping the disk in the desired format and allocating the defective regions to defective sectors. The list of defective sectors is then stored in a table. The user may selectively perform this format operation without the need to perform an AC erase of the entire disk and/or a write of all data sectors on the disk.

16 Claims, 3 Drawing Sheets

| SERVO SECTOR 10 | | | ID SECTOR (REGION) 11 | | | | | DATA SECTOR 12 | | | |
|---|---|---|---|---|---|---|---|---|---|---|---|
| W-R AND SPEED | AM | PES | R-W AND SPEED | VCO SYNC | ENDEC FLUSH | SYNC BYTE | ID AND CRC | R-W AND SPEED | VCO SYNC | ENDEC FLUSH | SYNC BYTE | DATA AND ECC |
| 15 | 16 | 17 | 18 | 19 | 20 | 21 | 22 | 23 | 24 | 25 | 26 | 27 |

Fig. 1

| SERVO SECTOR 30 | | | | DATA SECTOR 31 | | | |
|---|---|---|---|---|---|---|---|
| W-R AND SPEED | AM | POSITION | SERVO PAD | VCO SYNC | DATA AND ECC | DATA PAD |
| 32 | 34 | 36 | 38 | 42 | 44 | 46 |

Fig. 2

NO-ID DATA STORAGE DISK DRIVE DATA SECTOR FORMATTING SYSTEM AND METHOD

This is a third continued prosecution application (CPA) of Ser. No. 08/872,508 which was a file wrapper continuation (FWC) of patent application Ser. No. 08/531,240, filed Sep. 19, 1995, now abandoned.

BACKGROUND OF THE INVENTION

1. Field of the Invention

This invention relates generally to no-ID data storage disk drive systems and more particularly to data sector formatting operations in such systems.

2. Description of the Prior Art

In data storage systems such as magnetic disk drives, digital information is magnetically stored upon a surface of a magnetic medium such as a magnetic storage disk in a set of concentric circular patterns called tracks. The digital information is represented by selectively polarizing the surface of the disk. When this information is read back from the disk, the magnetic polarization of the medium is sensed and converted to an electrical output signal. The read and write operations are performed by read/write electronics in conjunction with a read/write head which flies over the surface of the rotating disk and provides an output signal.

Typically, storage disks of a disk drive are stacked in a disk stack which are mounted for rotation together on a single spindle. Each side of each disk in the disk stack has a surface which is usually used to store information. Each surface of a disk in the disk stack is usually exposed to at least one head responsible for reading and writing information on that particular surface. Typically, all the magnetic heads are mounted on actuator arms and move in tandem over the surfaces of the disk so that they are all at the same approximate disk radius at the same time.

In order to accurately move a magnetic head to a desired track and position the head over that track a servo system is utilized. The servo system performs two distinct functions known as the "seek" or "access" function and the "track following" function. During the seek operation the servo system moves a read/write head to a selected track from a previous track or from a parked position as quickly as possible. When the head reaches the desired track, the servo system begins a track following operation in which it accurately positions the head over the center line of the selected track and maintains the head in that position as successive portions of the track pass by the head.

During a seek operation the actuator arm where the head is located is moved as fast as possible so as to minimize the time required for that operation. Since the seek time is one of the most important factors considered in measuring the overall performance of disk drives, it is essential to minimize the time it takes for carrying out the seek operation.

In order to read and write data from the correct location in the disk stack, the data sectors in the disk stack are identified by cylinder address, head address and sector address (CHS). A cylinder identifies a set of specific tracks on the disk surfaces in the disk stack which lie at equal radii and are, in general, simultaneously accessible by the collection of heads. The head address identifies which head can read the data and therefore identifies the disk surface on which the data is located. Each track within a cylinder is further divided into sectors for storing data and servo information.

Many modern disk drives use a concept known as zone bit recording (ZBR) as taught by Hetzler in U.S. Pat. No. 5,210,660, and assigned to the assignee of the present invention, in which the disk surface is divided into radial zones and the data is recorded at a different data rate in each zone. The addition of zones requires expansion of the cylinder, head, sector (CHS) identification scheme to a zone, cylinder, head, sector (ZCHS) identification scheme.

Some disk drives have servo information only on a dedicated surface on one disk in the disk stack. However, many modern disk drives use a servo architecture known as sectored servo (also referred to as sector servo) as taught by Hetzler in U.S. Pat. No. 5,210,660 where servo information is interspersed with the data stored on each disk surface. The servo sector in sectored servo architecture contains position data on each track to help the magnetic head stay on that track. This approach is preferred because it can be implemented at low cost without extra components beyond those required for storing data and because it provides the servo information at the data surface which is being accessed, thereby eliminating all thermal sources of track misregistration (TMR).

The use of either sectored servo or dedicated servo surface architectures and the implementation of either of the two are well known to those skilled in the art.

There are also a number of methods used to format disk files, one of which is fixed block architecture (FBA) method which is used in both dedicated servo disk files and sectored servo disk files. In an FBA formatted disk file, each disk track is divided into a number of equal sized segments, and each segment is divided into sectors containing servo information, identification information (ID), and data.

FIG. 1 shows a typical segment 9 of a track on a FBA formatted disk utilizing sectored servo architecture. Segment 9 comprises sequentially a servo sector 10, an identification (ID) region 11 and a data sector 12. Servo sector 10 further comprises information such as write/read and speed field 15, address mark (AM) field 16 and position error signal (PES) field 17. The ID region 11, which is written onto the disk during the format operation contains specific information concerning the data sector 12 which can be used during normal operation, either writing or reading, to identify the succeeding data sector 12. The ID region 11 typically comprises a read/write and speed field 18, VCO sync field 19 encoder/decoder flush field 20, sync byte 21, and ID and CRC field 22. The data sector 12 typically comprises fields 23–26 which correspond to the ID fields 18–21 and data and ECC field 27. In a disk file having an ID region, the CHS/ZCHS information (otherwise known as logical block address (LBA)) is typically recorded on the data ID field 22 immediately proceeding the data sector.

Recently, a new method and system has been developed to increase capacity of disk drives known as the no-ID format and the disk drive systems utilizing no-ID format are commonly referred to as no-ID disk drive systems. This format has been taught by Best et al in U.S. Pat. No. 5,438,559 and assigned to the assignee of the present invention. For no-ID disk drives implementing a sector servo architecture, a full track number identifier in the position field in the servo sector of a given track is used in combination with a defect map to uniquely identify the requested data sectors and thereby completely eliminate the use of ID regions.

Once a disk drive completes the required seek operation to the cylinder and head identified, or to the zone, cylinder and head identified, the recording channel scans the desired data sector by examining the servo sector associated with each data sector as it passes under the head. When the appropriate data sector is found, the data is read and the operation is completed.

One problem encountered with disk drive systems (both ID and no-ID) has been that the data sector format operation is time consuming, expensive, and does not allow for ease of reformatting. The complete disk format operation consists of writing the servo sectors, data sectors and ID sectors (in the case of ID drives) along the concentric tracks of the magnetic recording disk. Typically, the entire operation is performed by the manufacturer, however, the customer may also do a data sector format operation.

The complete disk formatting process at the time of manufacture starts with a blank magnetic disk in a disk drive system. The servo sectors are then written using specialized machinery known as servo writers. The servo writers help to exactly position the magnetic head while it is writing the servo sectors. It is very important that the servo sectors be accurately positioned since they are used to position the head along the track during operation of the disk drive. The servo sectors are typically written at some specified angular distance from one another along the same track such that the servo sectors radially align with the corresponding sectors on adjacent tracks.

After the servo sectors are written, the entire disk surface is tested for defective regions. This is accomplished by writing the entire area of the disk with a surface analysis test (SAT) pattern using the transducer heads of the disk drive. The heads are then used to read the entire area just written. If the heads are unable to read from a particular region of the disk, that area is designated as a defective region. These defective regions are mapped by reference to their track position and their circumferential distance from a reference index mark on the disk. Typically the reference index mark is included in one of the radially aligned servo marks. Information on the location of the defective regions as well as other operational information which is needed by the drive is then written in a special reserved area of the disk drive. Typically the reserved area is in the outer most cylinders of the disk. At this point, the reserved area is the only portion of the disk on which the entire tracks have been completely formatted. Typically the reserved area is unaccessible to the user for purposes of writing or reading user data.

This next portion of the formatting operation is known as the data sector formatting process and is concerned only with the portion of the disk which is to be devoted to user data. In other words, the reserved area is not effected.

Next, the drive uses its transducer head to do an AC erase along each data track. The AC erase writes a frequency which is outside the band width of the typical data encountered by the read/write electronics. The AC erase is typically done at a frequency of less than 10 Hz or greater than 50 MHZ. The purpose of the AC erase is to clean up the magnetic disk to eliminate any local anomalies and gives the disk a more uniform distribution of magnetic domains.

After the AC erase, the next step, in the case of an ID drive, is to write the ID sectors and the data sectors. As explained above, the ID fields contain information on the addresses of the data sectors which follow. During the initial format operation, the data sectors are generally written with fixed patterns, usually binary zeros. In a disk drive with a regular transducer head, the ID and data sectors for each track are written on the same revolution of the disk. In other words, one revolution of the disk is needed to write all of the ID and data sectors of a single track.

In the case of an ID drive which uses an MR head, the ID and data sectors may have to be written separately. This is due to the fact that the read and write elements of an MR head are slightly offset in the radial direction from one another and it is therefore desirable that the ID sectors be offset along the radial direction relative to the data track halfway in between the read and write elements. In order to offset the ID sectors, the ID sectors and data sectors are written on separate revolutions of the disk. In other words, it takes two revolutions to write all the ID and data sectors of a single track.

In the case of a no-ID drive, after the AC erase step, the data sectors alone are written with fixed patterns, usually binary zeros. Id sectors are not recorded.

Today's disk drives are approaching six thousand (6,000) tracks per disk surface. The drives have at least two surfaces and sometimes many more. If one revolution and sometimes two revolutions are required to data format a single track of one data surface it is readily apparent that the data sector format operation may take a considerable amount of time. Current drives may require one half hour to an hour and one half for data sector formatting.

What is needed is a disk drive which may be data sector formatted quickly and inexpensively.

SUMMARY OF THE INVENTION

Briefly, in a preferred embodiment of the invention, a no-ID disk drive system is provided which does data sector formatting of the disk on an as needed basis. The disk drive has its servo sectors written at the time of manufacture. No additional formatting is done at this time. There are no prewritten data tracks and the disk has only the written servo sectors.

When it is desired to format or reformat the disk, the drive constructs the data sector address tables. The user may then selectively determine to perform an AC erase over the entire disk during the format operation or not. The user may also selectively determine to write all of the data sectors of the disk during the format operation or not. If the user decides not to write all of the data sectors during the format operation, the drive will only write the data sectors on an as needed basis while performing regular write operations. The format operation may thus be performed without having to write a single data sector on the disk. This is in contrast to the old method which required that every data sector be written on the disk during a data sector format operation.

For a fuller understanding of the nature and advantages of the present invention, reference should be made to the following detailed description taken in conjunction with the accompanying drawings.

BRIEF DESCRIPTION OF THE DRAWINGS

FIG. 1 is a schematic diagram of the sectors of a segment of a track on a disk file formatted using ID sectors;

FIG. 2 is a schematic diagram of a segment of a track on a disk file formatted with a no-ID architecture;

DESCRIPTION OF THE PREFERRED EMBODIMENTS

Figure 3:
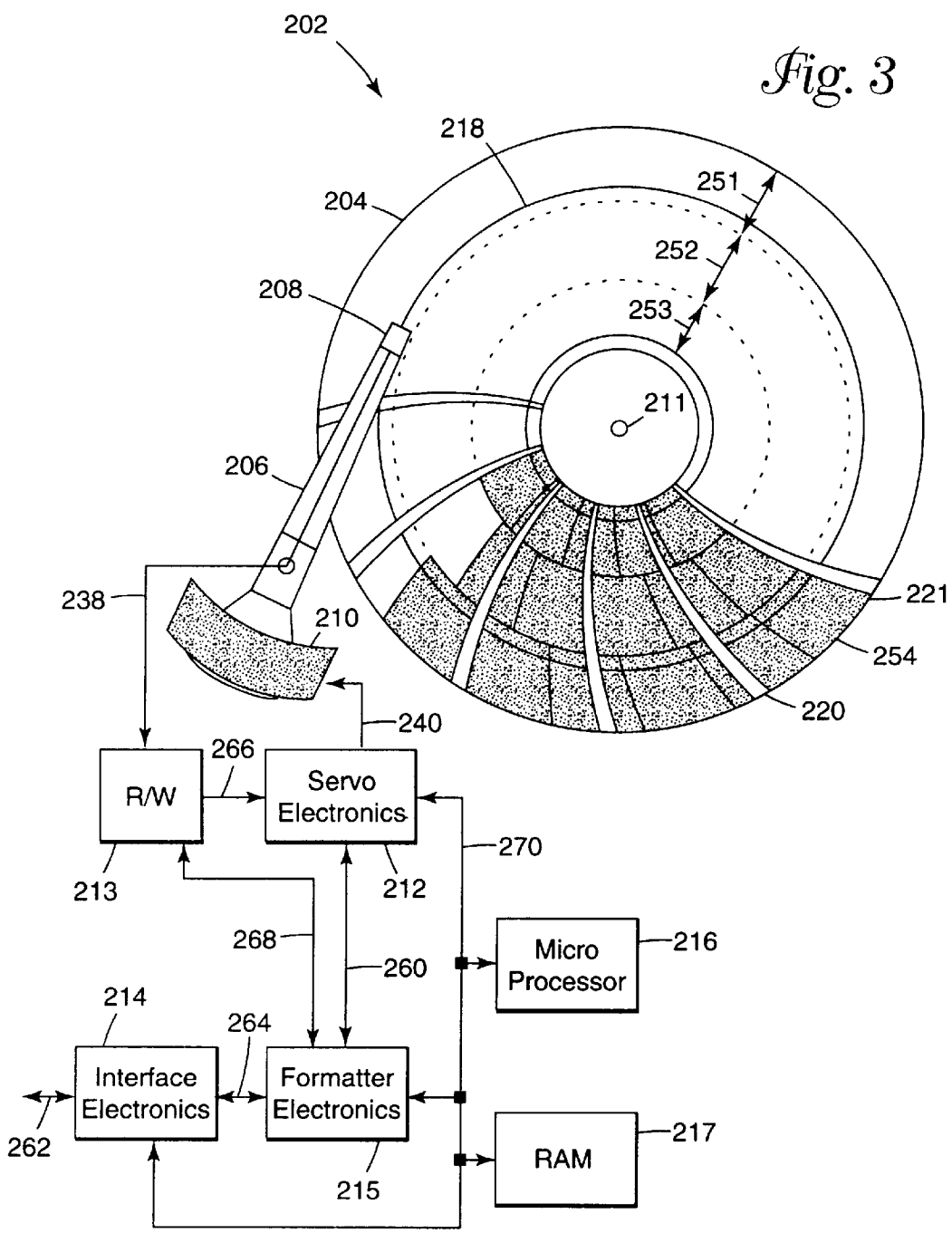
FIG. 3 is a schematic diagram of a disk drive of the present invention.

This invention is related to U.S. Pat. No. 5,438,559 issued Aug. 1, 1995, "Method For Locating Physical Sectors In A Fixed Block"; U.S. Pat. No. 5,210,660 issued May 11, 1993, "Sectored Servo Independent Of Data Architecture"; U.S. patent application Ser. No. 08/173,541 filed Dec. 23, 1993, now U.S. Pat. 5,523,903, "Sector Architecture For Fixed Block Disk Drive"; U.S. patent application Ser. No. 08/173, 588 filed Dec. 23, 1993, now U.S. Patent 5,937,435, "System and Method For Skip-Sector Mapping In A Data Recording Disk Drive"; U.S. patent application Ser. No. 08/363,445 filed Dec. 22, 1994, now U.S. Patent 5,890,209, "System and Method For Target Track Determination In A Data Storage Disk Drive"; and U.S. patent application Ser. No. 08/361,624 filed Dec. 22, 1994, now U.S. Patent 5,589, 998, "Cylinder Address Storage In Multiple Servo Sectors Of A Track"; U.S. patent application Ser. No. 08/321,142 filed Oct. 11, 1994, now U.S. Patent 5,568,606, "Adaptive Skew For Spindle Synchronization Of A Disk Drive", which are all assigned to the assignee of the present invention and are hereby incorporated by reference in their entirety.

FIG. 2 shows a schematic diagram of a no-ID segment 29 of a track of a disk used in the preferred embodiment of the present invention. The segment 29 comprises servo sector 30 and a data sector 31. The servo sector 30 typically comprises read to write recovery and speed compensation field 32, address mark field 34, position field 36, and servo pad field 38. Data sector 31 typically comprises a VCO sync field 42, data and ECC field 44 and data pad field 46.

Shown in FIG. 3 is a disk drive configured in accordance with the present invention. The disk drive is formatted using a fixed block architecture with sector servo and zone-bit recording. The disk drive, designated generally as 202, includes data recording disk 204, actuator arm 206, data recording transducer 208 (also called a recording head), voice coil motor 210, servo electronics 212, read/write electronics 213, interface electronics 214, formatter electronics 215, microprocessor 216 and RAM 217.

Data recording disk 204 includes a center of rotation about a spindle motor 211, and is divided for head positioning purposes into a set of radially spaced tracks, one of which is shown at 218. The tracks are grouped radially into a number of zones, three of which are shown as 251, 252, and 253. The disk contains a plurality of servo sectors 220, which extend across the tracks in a generally radial direction. Each track has a radially aligned reference index mark 221.

Within each zone, the tracks are also circumferentially divided into a number of data sectors 254. The data sectors contain no sector ID fields. In accordance with the normal meaning of "fixed block architecture", all data sectors are substantially the same size, expressed in bytes of data. However, it should be noted that the present invention may easily be adapted to tolerate some variation in data sector size, such as from 512 bytes per sector to 520 bytes per sector, in the event such a configuration was desirable for a particular implementation. The number of data sectors per track varies from zone to zone, and some of the data sectors do not begin immediately following a servo sector. Further, some of the data sectors are split by servo sectors. If the disk drive has multiple heads, then the set of tracks which are at the same radius on all surfaces is referred to as a "cylinder".

Read/write electronics 213 receives signals from transducer 208, passes servo information to servo electronics 212, and passes data signals to formatter 215. Servo electronics 212 uses the servo information to produce a current at 240 which drives voice coil motor 210 to position recording transducer 208. Interface electronics 214 communicates with a host system (not shown) over interface 262, passing data and command information. Interface electronics 214 also communicates with formatter 215 over interface 264. Microprocessor 216 communicates with the various other electronics over interface 270.

In the operation of disk drive 202, interface electronics 214 receives a request for reading or writing data sectors over interface 262. Formatter electronics 215 receives a list of requested data sectors from interface electronics 214 in logical block address (LBA) form and converts them into the physical block address (PBA) form of zone, cylinder, head and data sector numbers which uniquely identify the location of the desired data sectors. The head and cylinder information are passed to servo electronics 212, which is responsible for positioning recording head 208 over the appropriate data sector on the appropriate cylinder. If the cylinder number provided to servo electronics 212 is not the same as the track number over which recording head 208 is presently positioned, servo electronics 212 first executes a seek operation in order to reposition recording head 208 over the appropriate cylinder.

Once servo electronics 212 has positioned recording head 208 over the appropriate cylinder, servo electronics 212 begins executing sector computations in order to locate and identify the desired data sector. As servo sectors 220 pass under recording head 208, the no-ID approach described in aforementioned U.S. Pat. No. 5,438,559 is used to identify each servo sector. In brief, the reference index mark identifies the first servo sector, an address mark locates subsequent servo sectors, and a count of address marks uniquely identifies each servo sector. Additional information is maintained in association with servo electronics 212 and formatter electronics 215 and is used to determine whether the present servo sector splits a data sector or whether a new data sector starts immediately following the present servo sector. Further information is maintained in servo electronics 212 and formatter electronics 215 which identifies the location of (or the distance to) the start of the next data sector from the present servo sector. Still further information is maintained which identifies the location of (or the distance to) and additional data sectors which begin before the next subsequent servo sector. Still further information identifies the number of the data sectors from the reference index mark. This information is used to allow formatter electronics 215 to compare the data sector number passing under the recording head with the list of sectors received from interface electronics 214.

Figure 4:
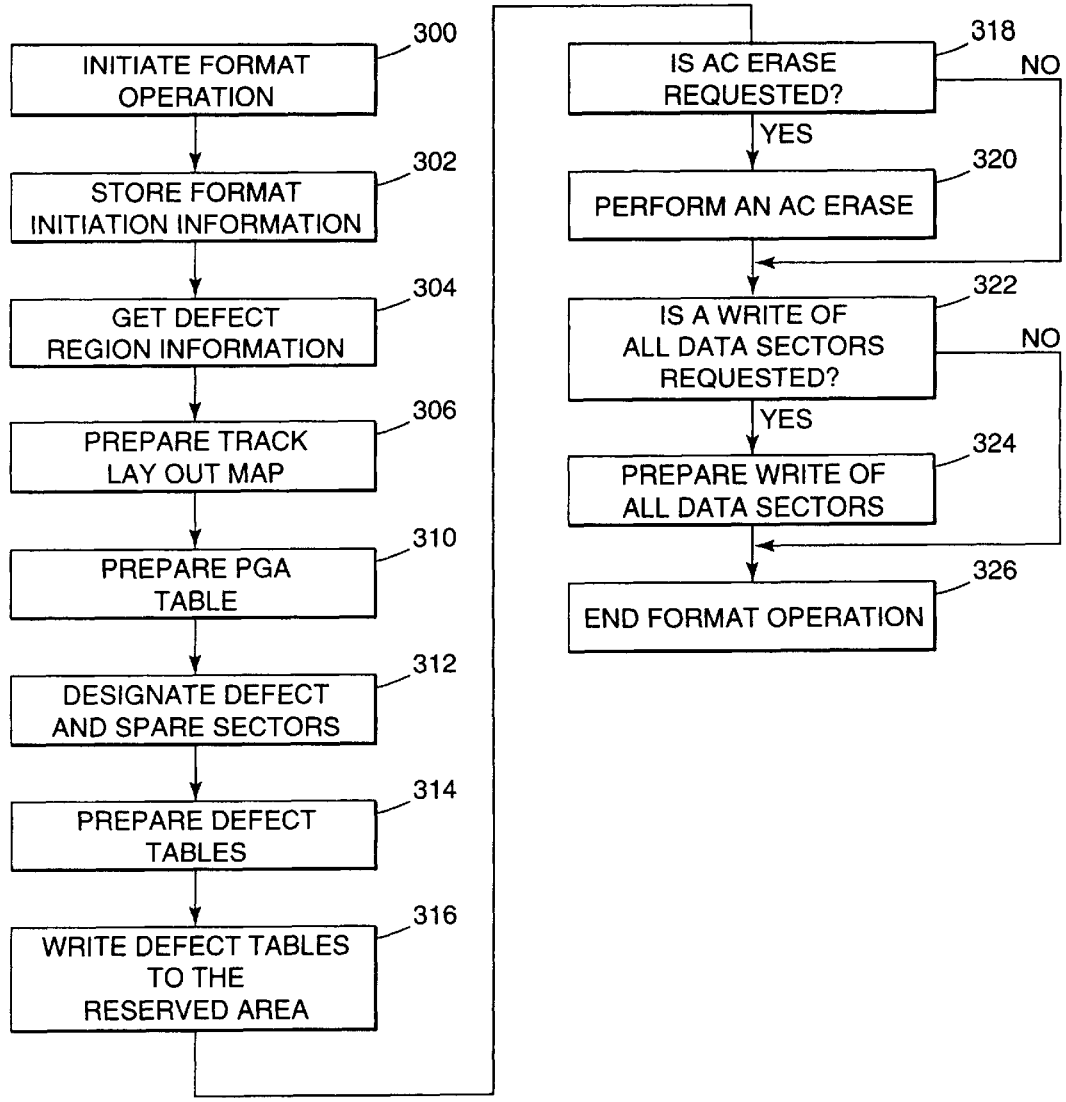
FIG. 4 is a flow chart diagram of the operation of the formatting of the disk drive of FIG. 3.

FIG. 4 shows a flow chart diagram of the data sector format operation of the present invention. The data sector format operation may be performed at the time of manufacture or may be a reformatting operation carried out after the drive has been in use. For purposes of the following discussion it is assumed that the servo sectors have already been written and are write protected such that they may not be overwritten. It is also assumed that the defective regions of the disks have been mapped and the information stored in the reserved area. These processes are well known in the art and are carried out at the time of manufacture.

Upon the initial power up of the drive 202, the microprocessor 216 reads the information from the reserved area of the disk 204 and stores the information in the RAM 217. Alternatively, this information could be stored in a nonvolatile memory such as a ROM. This reserved area information includes information on the initial setup of the disk drive including an initial format sector size. In addition, the reserved area information includes the instructions needed to carry out the data sector format operation of the present invention which is explained in the following steps referring to FIG. 4.

The user initiates a format operation at a step 300. This is accomplished by sending format initiation information to the interface electronics 214 from the host. The microprocessor 216 receives the format initiation information from the interface electronics.

At a step 302 the microprocessor stores the format initiation information into the RAM 217. The format initiation information contains information which alerts the microprocessor that a data format operation is desired. The information may also include information on the block size (which effects the number of data sectors per track) and whether or not an AC erase and/or a write of all data sectors is desired during this data sector format operation. At a step 304, the microprocessor retrieves the defect region information from the RAM 217. This information identifies the physical regions of the disk which contain defects. This information has previously been obtained during the manufacturing process. In addition, the user may have specifically designated other regions of the disk which he wants added to the defect list.

At a step 306, the microprocessor uses the user specified data sector block size to prepare a track layout map. The microprocessor determines where the data sector boundaries will occur given the user specified data sector length. The distances to consecutive sector boundaries are determined by starting at the index reference mark and allocating a distance sufficient to accommodate the length of each succeeding data sector. The length of any intervening servo sectors are taken into account.

At a step 310, the microprocessor uses the track layout map to prepare a physical block address (PBA) table. Each data sector is assigned a zone, cylinder, head and sector number which represents its exact physical location on the disk. There is no need to write the PBA table to the reserved area because the microprocessor will reconstruct the PBA upon each power up by using the format information stored in the reserved area.

At a step 312, the microprocessor designates defective and spare data sectors. This is accomplished by comparing the track layout map to the physical location of the defects. Data sectors which contain any portion of a defective region are designated as defective sectors. Once a number of defective sectors is identified, the microprocessor designates additional data sectors as spare data sectors. These spare data sectors are allocated in a uniform manner across the data tracks. The defective sectors and spare sectors typically consist of a very small percentage of the total number of data sectors. These spare data sectors are used whenever a previously good data sector goes bad. The information written in this bad sector is then allocated to the nearest spare sector. The spare sector is then removed from the defect and spare list and is thereafter considered to be a normal data sector. The bad sector is added to the defective sector list and is thereafter considered to be a defective sector.

At a step 314 the microprocessor prepares the defect tables. These tables contain a list of the defective and spare sectors. During read/write operations, the disk file performs logical block address (customer or system addressable block) to physical block address (total number of sectors available on a disk drive) conversion (logical to physical sector conversion) by searching the defect map for an entry having a value less than or equal to the request of the logical sector location identifier. If none is found, the physical block address is equal to the logical block address. If an entry is found, the corresponding offset representing the quantity of defective or spare sectors is extracted from the defect tables and added to the logical block address of the requested sector to produce the physical block address for that sector. The physical block address in turn is translated to either CHS (no zone recording) or ZCHS (zone recording present) in order to access a physical disk location. Thus, the microprocessor 216 is able to calculate the physical location of the desired sector using the requested logical block address and the defect tables.

At a step 316, the microprocessor writes the defect tables in the reserved area. A more detailed description of the construction and operation of defect tables is given in the above referenced patents and patent applications.

At a step 318, the microprocessor 216 determines if the user has requested an AC erase. The format initiation information which was originally stored in the RAM contains information on whether or not the AC erase is requested. If the AC erase is requested, then the process moves to a step 320 and if an AC erase is not requested it proceeds to a step 322.

At step 320, the AC erase of all tracks is performed. The AC erase is performed using the drive's transducer heads to write a frequency which is outside the bandwidth of the typical data used by the read/write electronics of the drive. Frequencies of less than 10 Hz. or greater than 50 MHZ. are typically used. This AC erase process is done sequentially through all of the tracks on all of the surfaces of the data area of the disk.

At a step 322, the microprocessor 216 determines if the user has requested a write of all data sectors. If yes, the process proceeds to a step 324 and if not, it proceeds to a step 326. Again, information on whether or not a write of all data sectors has been requested was contained in the initiation format information which was stored in RAM.

At a step 324, the drive performs a write of all data sectors. The drive instructs the data heads to write sequentially across all of the tracks of all of the surfaces of the data area of the disk. The data written is generally in the form of fixed patterns, usually binary zeros.

At a step 326, the format operation terminates and the drive returns to normal operation. Normal operation comprises the routine writing and reading of user data to the data portions of the disk. During normal operation, the drive will write user data to the data sectors on an as needed basis. Thus, if the step 324 of writing all data sectors is omitted, the drive is still able to function. The drive does not require that any of the data portion of the disk be physically formatted (data sectors magnetically recorded). Instead, the drive has constructed the virtual addresses of the data sectors. The actual physical writing of these data sectors is postponed until the drive actually needs to write user data to a particular data sector. At that time, the physical location on the disk is located and the data sector is physically written on the disk containing the user data. The drive thus begins normal operations, without previously having physically written all of the data sectors on the disk.

In the format operation of the present invention, the primary objective is the formation of defect tables. The drive has effectively remapped the sector boundaries of the entire disk and stored the resulting information. There is no need to actually physically change the sector boundaries at this time. Thus, the user may selectively omit the AC erase of all the data tracks and/or the writing of all data sectors on the data tracks. It is these two steps that are very time consuming in a traditional data format operation. Data formatting times of one half hour to over an hour and one half are typical.

With the new format operation of the present invention wherein the user selectively omits the AC erase and data sector write steps, the entire data format operation consists of just constructing new sector tables and as a consequence the format operation may be performed in as little time as 3 seconds.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for formatting and recording data to data sectors of the disk on an as needed basis, comprising:

writing only the servo sectors on the disk until formatting is selected;

selecting to format the disk, wherein the formatting comprises:

(a) constructing data sector address tables mapping data sectors based upon a specified data sector length;

(b) determining whether a user selects to format write all of the data sectors of the disk; and (c) format writing all of the data sectors of the disk when the user selects to write all of the data sectors of the disk; and format writing data to data sectors on an as needed basis while performing write operations based upon the mapping and ignoring whether all of the data sectors of the disk are format written.

2. The method of claim 1, further comprising, prior to step (a), the steps of:

(h) identifying defects on the data surface; and (i) constructing a defect table therefrom.

3. The method of claim 2, wherein step (c) further includes the step of identifying additional defects on the data surface.

4. The method of claim 3, wherein the data sector formatting steps of claim 1 are repeated during which the additional defects are added to the defect table.

5. The method of claim 2, further comprising the step of identifying some of the data sectors as spare sectors and adding the spare sectors to the defect list.

6. The method of claim 1 wherein the formatting further comprises:

determining whether the user selects to perform an AC erase over the entire disk; and performing an AC erase over the entire disk when the user selects to perform an AC erase.

7. A disk storage system having data sector formatting of the disk on an as needed basis, comprising:

a magnetic storage disk having only servo sectors recorded thereon;

a transducer head located proximate to the disk for reading and writing data to and from the disk;

a disk movement device for rotating the disk;

a head movement device for moving the head relative to the disk;

servo device, coupled to the head and the head movement device, for controlling the movement of the head movement device;

a memory device configured to store a table of data sector address for the disk; and a data processing device configured to selectively format the disk by constructing data sector address tables for the disk mapping data sectors based upon a specified data sector length, determining whether a user selects to format write all of the data sectors of the disk and format writing all of the data sectors of the disk when the user selects to write all of the data sectors of the disk, wherein the data processing device format writes only data sectors needed while performing data write operations based upon the mapping and ignoring whether all of the data sectors of the disk are format written.

8. The system of claim 7, wherein the table of data sector addresses includes information on the location of the defective data sectors.

9. The system of claim 7, wherein the table of data sector addresses includes information on the location of any spare data sectors.

10. The system of claim 7, wherein the data processing device is configured to change the size of the data sectors by changing the table of data sector addresses during disk formatting.

11. The disk storage system of claim 7 wherein the formatting further comprises determining whether the user selects to perform an AC erase over the entire disk and performing an AC erase over the entire disk when the user selects to perform an AC erase.

12. A formatting apparatus, comprising a memory device configured to store a table of data sector address for the disk;

a data processing device configured to write only the servo sectors on the disk until formatting is selected and for allowing a user to select to format the disk, wherein data processing device formats the disk by constructing data sector address tables for the disk mapping data sectors based upon a specified data sector length, determining whether a user selects to format write all of the data sectors of the disk and format writing all of the data sectors of the disk when the user selects to write all of the data sectors of the disk and wherein the data processing device writes data only to data sectors needed during write operations based upon the mapping and ignoring whether all of the data sectors of the disk are format written.

13. The apparatus of claim 12, wherein the table of data sector addresses includes information on the location of the defective data sectors.

14. The apparatus of claim 12, wherein the table of data sector addresses includes information on the location of any spare data sectors.

15. The apparatus of claim 12, wherein the data formatting device is configured to change the size of the data sectors by changing the table of data sector addresses during the data format operation.

16. The formatting apparatus of claim 12 wherein the data processing device is further configured to format the disk by determining whether the user selects to perform an AC erase over the entire disk and by performing an AC erase over the entire disk when the user selects to perform an AC erase.

* * * * *